United States Patent
Kim et al.

(10) Patent No.: US 9,066,343 B2
(45) Date of Patent: *Jun. 23, 2015

(54) METHOD FOR TRANSMITTING CONTROL CHANNEL TO RELAY NODE IN WIRELESS COMMUNICATION SYSTEM AND APPARATUS THEREOF

(71) Applicant: LG ELECTRONICS INC., Seoul (KR)

(72) Inventors: Hak Seong Kim, Anyang-si (KR); Byoung Hoon Kim, Anyang-si (KR); Dae Won Lee, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,671

(22) Filed: Aug. 11, 2014

(65) Prior Publication Data

US 2014/0348058 A1 Nov. 27, 2014

Related U.S. Application Data

(63) Continuation of application No. 13/582,352, filed as application No. PCT/KR2011/002850 on Apr. 20, 2011, now Pat. No. 8,817,732.

(60) Provisional application No. 61/327,090, filed on Apr. 22, 2010.

(30) Foreign Application Priority Data

Mar. 25, 2011 (KR) .................. 10-2011-0026759

(51) Int. Cl.
*H04W 72/04* (2009.01)
*H04B 7/14* (2006.01)
*H04B 7/26* (2006.01)
*H04L 5/00* (2006.01)
*H04W 84/04* (2009.01)

(52) U.S. Cl.
CPC .......... *H04W 72/042* (2013.01); *H04B 7/2606* (2013.01); *H04L 5/0007* (2013.01); *H04L 5/001* (2013.01); *H04L 5/0032* (2013.01); *H04L 5/0053* (2013.01); *H04W 72/0426* (2013.01); *H04W 84/047* (2013.01); *H04B 7/14* (2013.01)

(58) Field of Classification Search
None
See application file for complete search history.

(56) References Cited

U.S. PATENT DOCUMENTS

2011/0038303 A1 2/2011 Ji et al.
2011/0128893 A1 6/2011 Park et al.
(Continued)

FOREIGN PATENT DOCUMENTS

CN 101663908 A 3/2010
CN 101682406 A 3/2010
(Continued)

OTHER PUBLICATIONS

NEC Group, "R-PDCCH blind decoding for Frequency Diversity and Frequency Selective R-PDCCH transmissions," TSG-RAN WG1#60, Feb. 22-26, 2010, pp. 1-5, R1-101321.

NEC Group, "Supporting frequency diversity and frequency selective R-PDCCH transmissions," TSG-RAN WG1#60, Feb. 22-26, 2010, pp. 1-5, R1-101320.

*Primary Examiner* — Kerri Rose

(74) *Attorney, Agent, or Firm* — Birch, Stewart, Kolasch & Birch, LLP

(57) ABSTRACT

A method for receiving a Relay Physical Downlink Control CHannel (R-PDCCH) by a User Equipment (UE) in a wireless communication system. The method includes receiving a downlink subframe including one or more aggregated resource blocks including resource elements. The resource elements are mapped in increasing order of first a subcarrier index, and then a symbol index. The method further includes monitoring the R-PDCCH on the one or more aggregated resource blocks. The one or more aggregated resource blocks are numbered based on an aggregation level and a number of the one or more aggregated resource blocks corresponding to the aggregation level.

6 Claims, 14 Drawing Sheets

(56) References Cited

U.S. PATENT DOCUMENTS

| | | |
|---|---|---|
| 2012/0113884 A1 | 5/2012 | Park et al. |
| 2012/0120868 A1 | 5/2012 | Park et al. |
| 2012/0178360 A1 | 7/2012 | Park et al. |
| 2012/0320782 A1 | 12/2012 | Seo et al. |

FOREIGN PATENT DOCUMENTS

| | | |
|---|---|---|
| JP | 2010-541462 A | 12/2010 |
| WO | WO 2009/045076 A2 | 4/2009 |
| WO | WO 2010/013980 A2 | 2/2010 |
| WO | WO 2010/041835 A2 | 4/2010 |
| WO | WO 2010/041878 A2 | 4/2010 |
| WO | WO 2011/019254 A2 | 2/2011 |

E-UMTS

Fig. 2
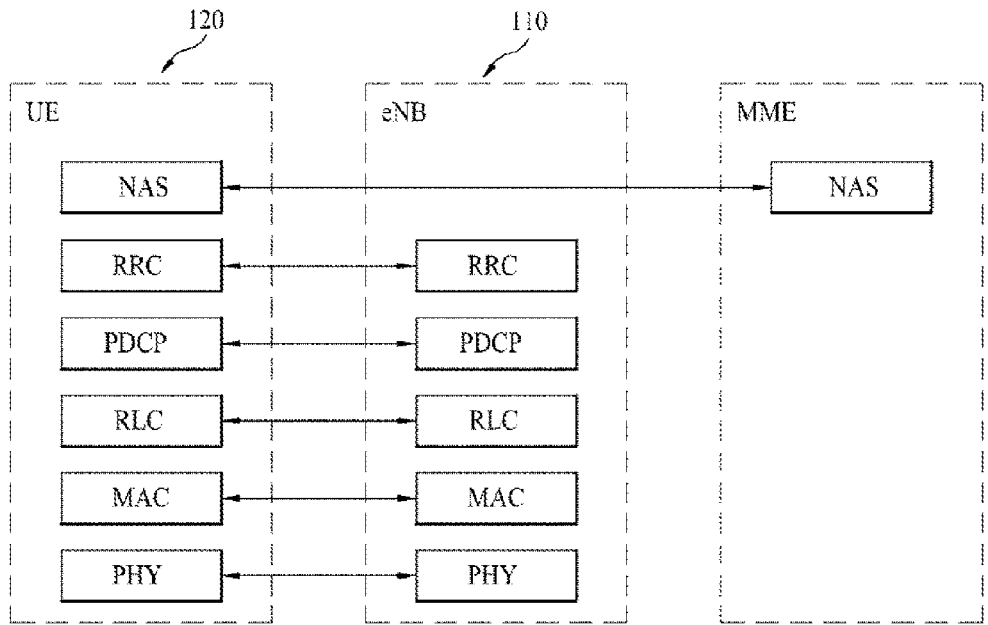
(a) Control-Plane Protocol Stack
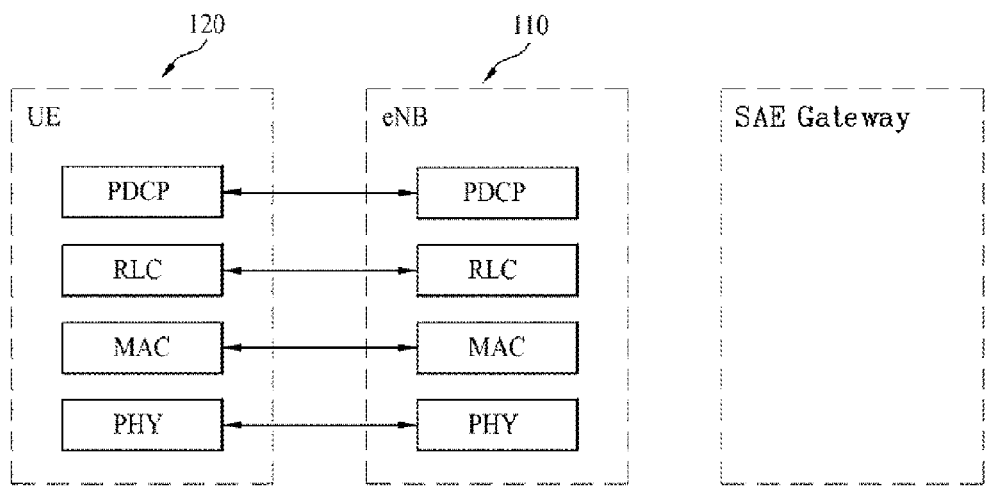
(b) User-Plane Protocol Stack

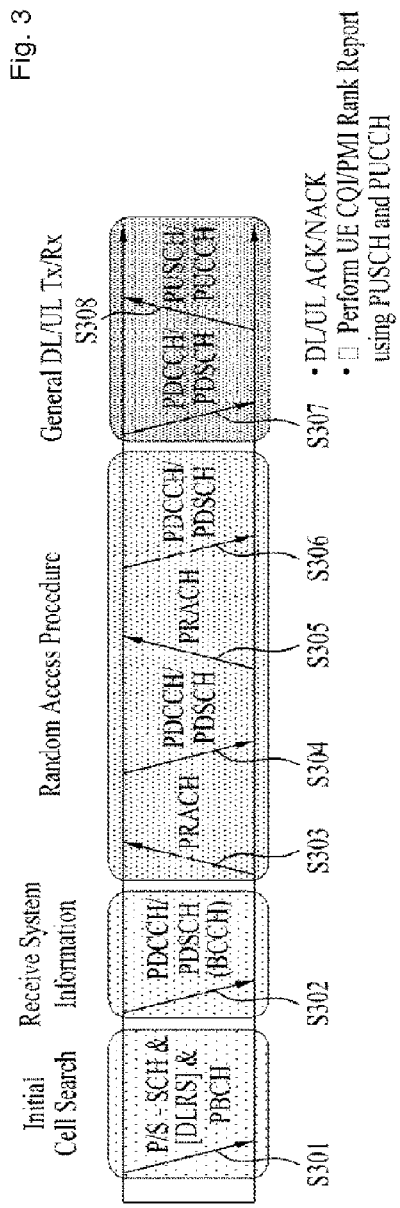
Fig. 3
Fig. 4
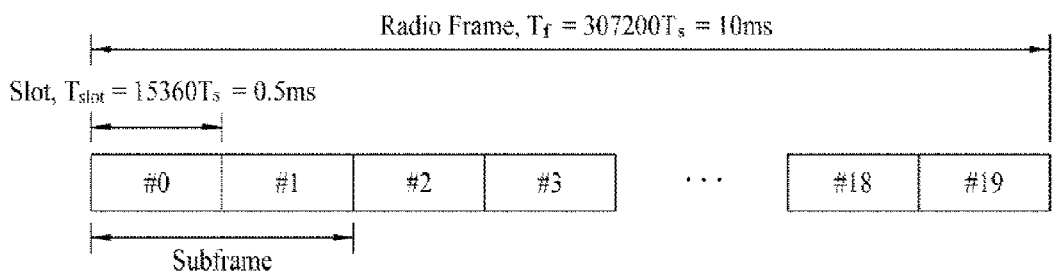

Fig. 6
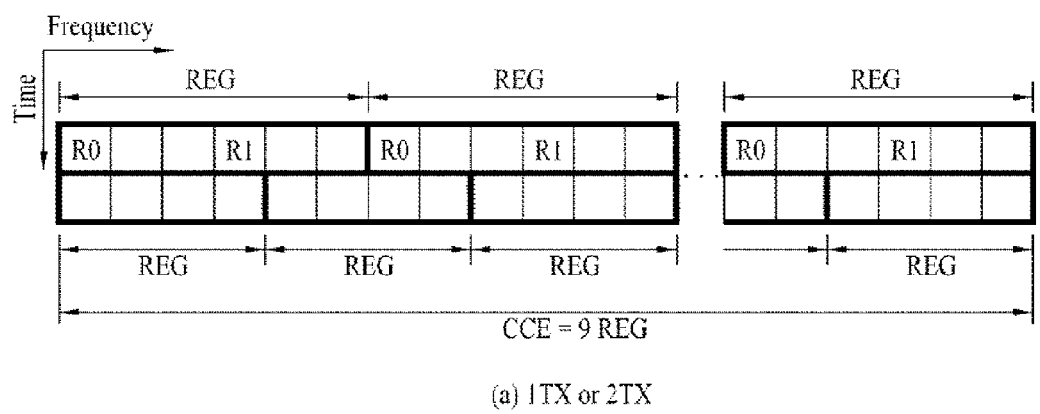
(a) 1TX or 2TX
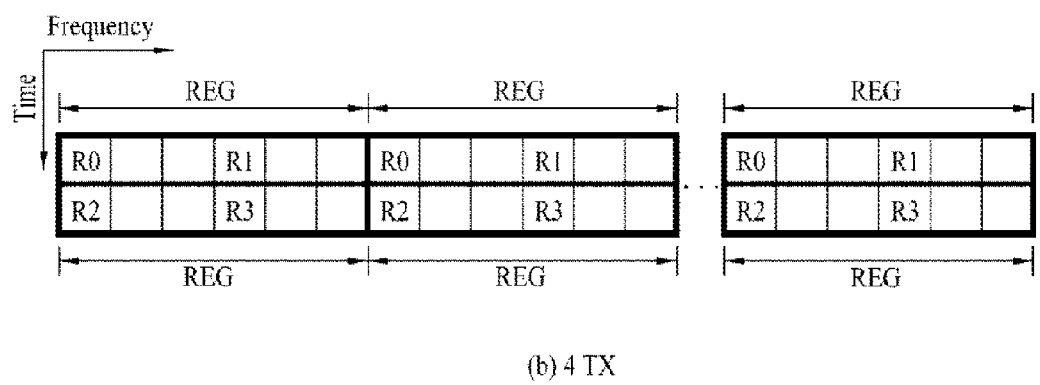
(b) 4 TX

Aggregation Level = 2

Aggregation Level = 2

METHOD FOR TRANSMITTING CONTROL CHANNEL TO RELAY NODE IN WIRELESS COMMUNICATION SYSTEM AND APPARATUS THEREOF

CROSS-REFERENCE TO RELATED APPLICATIONS

This application is a Continuation of copending application Ser. No. 13/582,352, filed on Aug. 31, 2012, which was filed as the National Stage of PCT International Application No. PCT/KR2011/002850 on Apr. 20, 2011, which claims the benefit under 35 U.S.C. §119(e) to U.S. Provisional Application No. 61/327,090, filed on Apr. 22, 2010, and under 35 U.S.C. §119(a) to Patent Application No. 10-2011-0026759, filed in the Republic of Korea on Mar. 25, 2011, all of which are hereby expressly incorporated by reference into the present application.

BACKGROUND OF THE INVENTION

1. Field of the Invention

The present invention relates to a wireless communication system. And, more particularly, the present invention relates to a method for transmitting control channel in wireless communication system and apparatus thereof.

2. Discussion of the Related Art

As an example of a wireless communication system to which the present invention may be applied, a 3GPP LTE (3rd Generation Partnership Project Long Term Evolution; hereinafter referred to as "LTE") communication system will now be broadly described.

FIG. 1 illustrates a general view of an E-UMTS network structure as an example of a wireless communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE) (120), base stations (eNode B; eNB) 110*a* and 110*b*, and an Access Gateway (AG), which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) unit basis, wherein one TA unit includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, extended service availability, usage of a flexible frequency band, simple structure and open interface, and adequate power consumption of the user equipment are being requested.

SUMMARY OF THE INVENTION

Based upon the discussions made as described above, hereinafter, the present invention proposes a method for transmitting control channel in wireless communication system and apparatus thereof.

In an aspect of the present invention, in a method for transmitting a relay node specific downlink physical control channel (R-PDCCH) at a base station in a wireless communication system, the includes the steps of allocating one or more Resource Blocks (RBs) for the relay node specific downlink physical control channel, mapping the relay node specific downlink physical control channel to the one or more resource blocks, and transmitting the relay node specific downlink physical control channel to the relay node by using the one or more resource blocks, wherein the mapping step includes mapping the relay node specific downlink physical control channel along a frequency direction in a symbol belonging to a lowermost index, among the one or more resource blocks, and then mapping the relay node specific downlink physical control channel along the frequency direction in a symbol belonging to a next index.

Meanwhile, in another aspect of the present invention, a base station includes a processor configured to allocate one or more Resource Blocks (RBs) for the relay node specific downlink physical control channel, and configured to map the relay node specific downlink physical control channel to the one or more resource blocks, and a transmission module configured to transmit the relay node specific downlink physical control channel to the relay node by using the one or more resource blocks, wherein the processor maps the relay node specific downlink physical control channel along a frequency direction in a symbol belonging to a lowermost index, among the one or more resource blocks, and then maps the relay node specific downlink physical control channel along the frequency direction in a symbol belonging to a next index.

Preferably, the relay node specific downlink physical control channel may be mapped along an increasing direction of subcarrier indexes starting from a lowermost index, in all of the allocated one or more resource blocks. Herein, the one or more resource blocks may be aggregated to a predetermined number. And, information on the predetermined number may be explicitly signaled to the relay node.

According to the embodiments of the present invention, in a wireless communication system, a relay node may effectively receive a control channel from the base station.

Additional effects of the present application will be set forth in part in the description which follows and in part will

BRIEF DESCRIPTION OF THE DRAWINGS

FIG. 2 illustrates a Control Plane structure and a User Plane structure of a Radio Interface Protocol between a user equipment and the E-UTRAN based upon the 3GPP radio access network standard.

FIG. 3 illustrates physical channels that are used in the 3GPP system and a general method for transmitting signals using such physical channels.

FIG. 4 illustrates an exemplary structure of a radio frame that is used in the LTE system.

FIG. 6 illustrates a resource unit that is used for configuring a control channel.

DETAILED DESCRIPTION OF THE INVENTION

Figure 1:
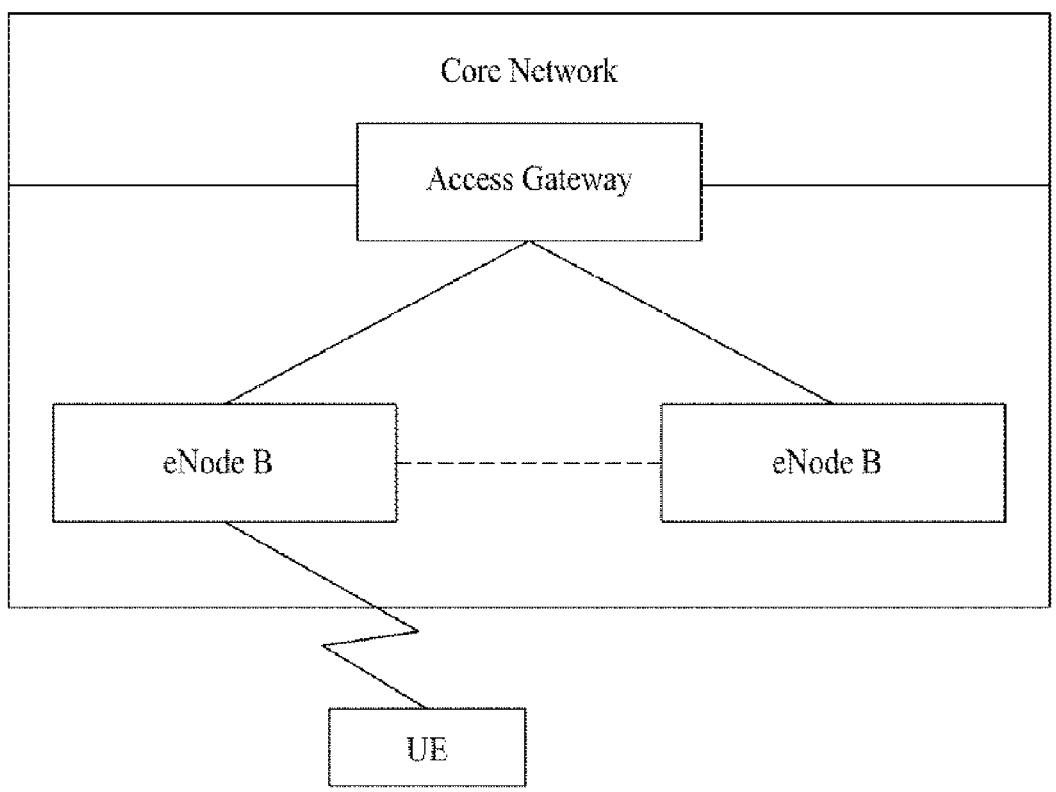
FIG. 1 illustrates a general view of an E-UMTS network structure as an example of a wireless communication system.

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention. The following embodiments of the present invention correspond to examples wherein the technical features of the present invention are applied in the 3GPP system.

The description of the present invention will describe the embodiments of the present invention by using the LTE system and the LTE-A system. However, this is merely exemplary, and, therefore, the present invention may be applied to any other corresponding to the above-described definition. Also, the description of the present invention will also describe the embodiments of the present invention based upon an FDD method. However, this is also merely exemplary, and, therefore, the present invention may also be easily modified and applied to an H-FDD method or a TDD method.

FIG. 2 illustrates a Control Plane structure and a User Plane structure of a Radio Interface Protocol between a user equipment and the E-UTRAN based upon the 3GPP radio access network standard. A control plane refers to a path through which control messages are transmitted. Herein, the control messages are used by the User Equipment (UE) and network in order to manage a unit. And, a user plane refers to a path through which data generated from an application layer are transmitted. Such data may include audio data or Internet packet data, and so on.

A first layer, which corresponds to a physical layer, uses a physical channel to provide an Information Transfer Service to a higher layer. The physical layer is connected to a Medium Access Control layer, which corresponds to a higher layer, through a Transport Channel. And, herein, data is transported between the Medium Access Control layer and the physical layer through the Transport Channel. In a data transmission between a physical layer of the transmitting end and a physical layer of the receiving end, data are transported between the physical layers through a physical channel. Herein, the physical layer uses time and frequency as radio resource. More specifically, in a downlink, the physical channel is modulated by using an OFDMA (Orthogonal Frequency Division Multiple Access) scheme, and, in an uplink, the physical channel is modulated by using an SC-FDMA (Single Carrier Frequency Division Multiple Access) scheme.

A Medium Access Control (MAC) layer of a second layer provides services to a Radio Link Control (RLC) layer, which corresponds to higher layer, through a logical channel. The Radio Link Control (RLC) layer of the second layer supports the transmission of reliable data. The function of the RLC layer may also be realized by a functional block within the MAC. A PDCP (Packet Data Convergence Protocol) layer of the second layer performs a header compression function, which can reduce unnecessary control information in order to efficiently transmit IP packets, such as IPv4 or IPv6, in a wireless (or radio) interface having a narrow bandwidth.

A radio resource control (RRC) layer which is positioned in a lowermost portion of a third layer is defined only in the control plane. And, in relation with the configuration, re-configuration, and release of radio bearers (RBs), the RRC layer performs the role of controlling the logical channels, the transmission channels, and the physical channels. The RB refers to a service that is provided by the second layer in order to deliver (or transport) data between the UE and the network. In order to do so, the RRC layers of the UE and the network exchanges RRC messages to and from one another. If an RRC connection exists between the RRC layer of the UE and the RRC layer of the network, the user equipment is in an RRC Connected Mode. And, if not, the user equipment is in an RRC Idle Mode. An NAS (Non-Access Stratum) layer, which is located above the RRC layer performs the roles of Session Management and Mobility Management.

One cell that configures a base station (eNB) is set to one of bandwidths of 1.25, 2.5, 5, 10, and 20 Mhz, thereby providing a downlink or uplink transport service to several user equipments. Different cells may be set to provide different bandwidths.

In the network, downlink transmission channels that transmit data to the UE include a BCH (Broadcast Channel), which transmits system information, a PCH (Paging Channel), which transmits paging messages, and a downlink SCH (Shared Channel), which transmits information other than the system information, such as user traffic or control messages.

In case of traffic information or control messages of a downlink multicast or broadcast service, the corresponding data may be transmitted through a downlink SCH or may also be transmitted through a separate downlink MCH (Multicast Channel). Meanwhile, uplink transmission channels that transmit data from the UE to the network include a RACH (Random Access Channel), which transmits initial control messages, and an uplink SCH (Shared Channel), which transmits information other than the system information, such as user traffic or control messages. Logical Channels being in a level higher than the transmission channel and being mapped to the transmission channel include a BCCH (Broadcast Channel), a PCCH (Paging Control Channel), a CCCH (Common Control Channel), an MCCH (Multicast Control Channel), an MTCH (Multicast Traffic Channel), and so on.

FIG. 3 illustrates physical channels that are used in the 3GPP system and a general method for transmitting signals using such physical channels. The user equipment performs initial cell search such as synchronization with the base station, when it newly enters a cell or when the power is turned on (S301). In order to do so, the user equipment synchronizes with the base station by receiving a Primary Synchronization Channel (P-SCH) and a Secondary Synchronization Channel (S-SCH) from the base station, and then acquires information such as cell ID, and so on. Thereafter, the user equipment may acquire broadcast information within the cell by receiving a Physical Broadcast Channel from the base station. Meanwhile, in the step of initial cell search, the user equipment may receive a Downlink Reference Signal (DL RS) so as to verify the downlink channel status.

Once the user equipment has completed the initial cell search, the corresponding user equipment may acquire more detailed system information by receiving a Physical Downlink Control Channel (PDCCH) and a Physical Downlink Shared Channel (PDSCH) based upon the respective information carried in the PDCCH (S302).

Meanwhile, if the user equipment initially accesses the base station, or if there are no radio resources for signal transmission, the user equipment may perform a Random Access Procedure (RACH) with respect to the base station (S303 to S306). In order to do so, the user equipment may transmit a specific sequence to a preamble through a Physical Random Access Channel (PRACH) (S303 and S305), and may receive a response message respective to the preamble through the PDCCH and the PDSCH corresponding to the PDCCH (S304 and S306). In case of a contention based RACH, a Contention Resolution Procedure may be additionally performed.

After performing the above-described process steps, the user equipment may perform PDCCH/PDSCH reception (S307) and Physical Uplink Shared Channel (PUSCH)/Physical Uplink Control Channel (PUCCH) transmission (S308), as general uplink/downlink signal transmission procedures. Particularly, the user equipment receives Downlink Control Information (DCI) through the PDCCH. Herein, the DCI includes control information, such as resource allocation information respective to the user equipment. Herein, the format of the DCI may vary depending upon its purpose of usage.

Meanwhile, the control information, which is transmitted by the user equipment to the base station or received by the user equipment from the base station via uplink, includes downlink/uplink ACK/NACK signals, a CQI (Channel Quality Indicator), a PMI (Precoding Matrix Index), an RI (Rank Indicator), and so on. In case of the 3GPP LTE system, the user equipment may transmit control information, such as the above-described CQI/PMFRI through the PUSCH and/or the PUCCH.

FIG. 4 illustrates an exemplary structure of a radio frame that is used in the LTE system.

Referring to FIG. 4, a radio frame has the length of 10 ms (327200×TS) and is configured of 10 subframes each having the same size. Each subframe has the length of 1 ms and is configured of 2 slots. Each slot has the length of 0.5 ms (15360×TS). Herein, TS represents a sampling time and is indicated as $TS=1/(15\ kHz \times 2048)=3.2552 \times 10^{-8}$ (approximately 33 ns). A slot includes a plurality of OFDM symbols in the time domain and includes a plurality of Resource Blocks (RBs) in the frequency domain. In the LTE system, one resource block includes 12 subcarriers×7(6) OFDM symbols. A TTI (Transmission Time Interval), which corresponds to a unit time during which data are transmitted, may be decided as one or more subframe units. Herein, the above-described radio frame structure is merely exemplary. And, therefore, the number of subframes included in a radio frame, or the number of slots included in a subframe, or the number of OFDM symbols included in a slot may be diversely varied.

Figure 5:
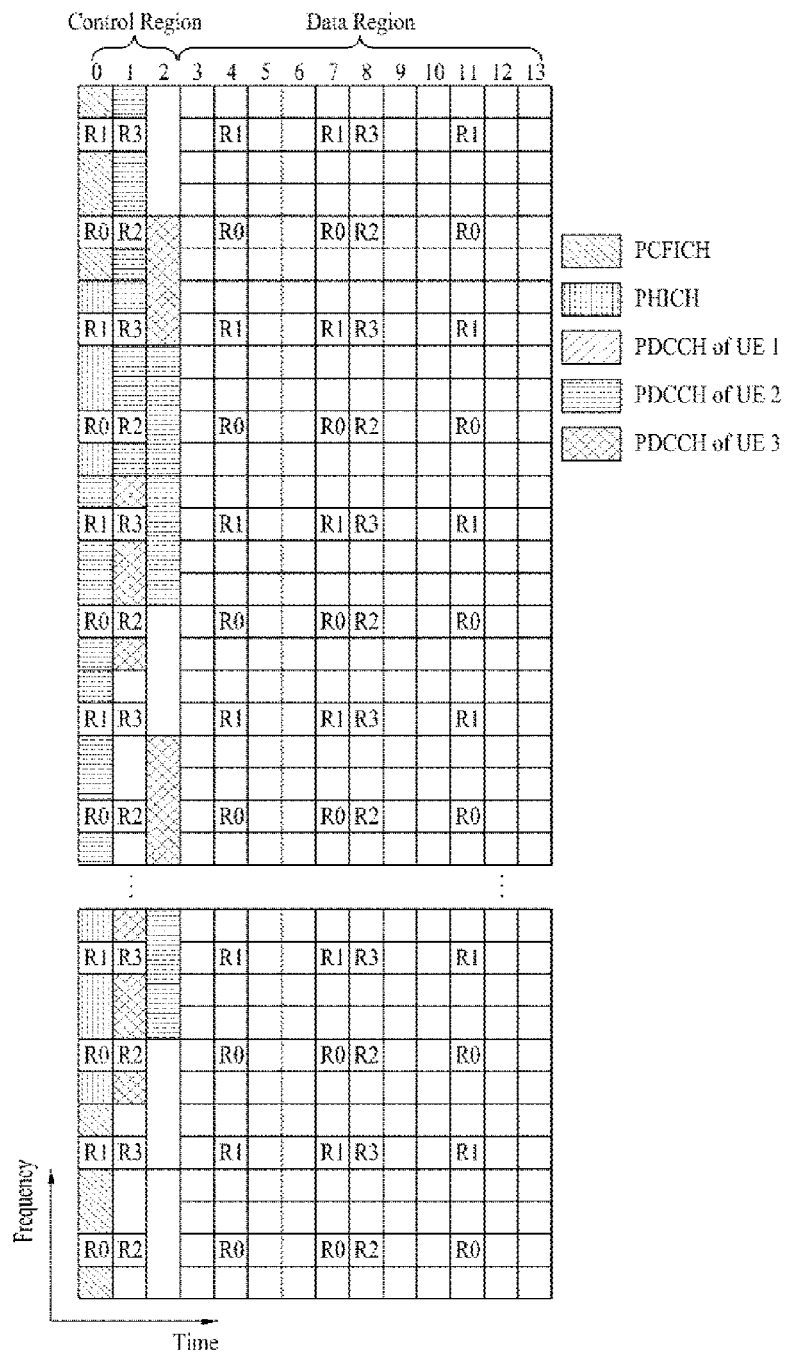
FIG. 5 illustrates an exemplary structure of a downlink radio frame that is used in the LTE system.

FIG. 5 illustrates an exemplary structure of a downlink radio frame that is used in the LTE system. Referring to FIG. 5, one subframe is configured of 14 OFDM symbols. Depending upon the subframe settings, the first one to three OFDM symbols are used as the control region, and the remaining 13~11 OFDM symbols are used as the data region. Referring to the drawing, R1 to R4 respectively represent Reference Signals (RSs) or Pilot Signals for antennas 0 to 3. Regardless of the control region and the data region, the RS is fixed within the subframe according to a consistent pattern. A control channel is allocated to resources of the control region to which the RS is not allocated. And, a traffic channel is allocated to resources of the data region to which the RS is not allocated. Control channels that are allocated to the control region may include a PCFICH (Physical Control Format Indicator CHannel), a PHICH (Physical Hybrid-ARQ Indicator CHannel), a PDCCH (Physical Downlink Control CHannel), and so on.

As a Physical Control Format Indicator Channel, the PCFICH notifies the user equipment of the number of OFDM symbols used in the PDCCH for each subframe. The PCFICH is located in the first OFDM symbol and is configured at a higher priority level than the PHICH and the PDCCH. The PCFICH is configured of 4 REGs (Resource Element Groups), and each REG is distributed (or spread) within the control region based upon the Cell ID (Cell Identity). One REG is configured of 4 REs (Resource Elements). An RE represents a minimum physical resource defined by one subcarrier×one OFDM symbol. The PCFICH value indicates a value ranging from 1 to 3 or from 2 to 4 depending upon the bandwidth and is modulated by using QPSK (Quadrature Phase Shift Keying).

As a Physical HARQ (Hybrid-Automatic Repeat and request) Indicator Channel, the PHICH is used for delivering HARQ ACK/NACK respective to uplink transmission. More specifically, the PHICH represents a channel through which DL ACK/NACK information for UL HARQ is transmitted. The PHICH consists of one REG and is cell-specifically scrambled. An ACK/NACK is indicated by 1 bit and is modulated by using BPSK (Binary phase shift keying). The modulated ACK/NACK is distributed (or spread) by a Spreading Factor (SF)=2 or 4. A plurality of PHICH being mapped to the same resource configures a PHICH group. The number of PHICHs being multiplexed in the PHICH group is decided in accordance with the number of spreading codes. The PHICH (group) is repeated 3 times in order to obtain diversity gain in the frequency domain and/or the time domain.

As a Physical Downlink Control Channel, the PDCCH is allocated to the first n number of OFDM symbols of a subframe. Herein, n is an integer equal to or greater than 1, and n is designated by the PCFICH. The PDCCH is configured of one or more CCEs. The PDCCH notifies each user equipment or a user equipment group of information associated to resource allocation of a PCH (Paging Channel) and a DL-SCH (Downlink-shared channel), Uplink Scheduling Grant, HARQ information, and so on. The PCH (Paging Channel) and the DL-SCH (Downlink-shared channel) are transmitted through the PDSCH. Therefore, with the exception for specific control information or specific service data, the base station and the user equipment generally transmit and receive data through the PDSCH.

Information on the user equipment (one user equipment or a plurality of user equipments) to which the data of the PDSCH are to be transmitted, and information on how the user equipments receive and decode the transmitted PDSCH data are included in the PDCCH and transmitted. For example, it is assumed that a specific PDCCH is processed with CRC masking with an RNTI (Radio Network Temporary Identity) "A", and it is also assumed that information on the data being transmitted by using a radio resource (e.g., frequency position) "B" and a transmission format information (e.g., transmission block size, modulation method, coding information, etc.) "C" are transmitted through a specific subframe. In this case, a user equipment within a cell uses its own RNTI so as to monitor the PDCCH. And, when one or more user equipments carries RNTI "A", the corresponding user equipments receive the PDCCH and then receive the PDSCH, which is indicated by "B" and "C", through the received PDCCH information.

FIG. 6 illustrates a resource unit that is used for configuring a control channel. More specifically, (a) of FIG. 6 illustrates a case where the number of transmission antennae within the base station is equal to 1 or 2, and (b) of FIG. 6 illustrates a case where the number of transmission antennae within the base station is equal to 4. Herein, only the RS (Reference Signal) pattern varies depending upon the number of transmission antennae. Otherwise, the method for configuring resource units in association with the control channel is the same.

Referring to FIG. 6, a basic resource unit of the control channel is an REG. Herein, while excluding the RS, the REG is configured of 4 resource elements (REs) adjacent to one another. In FIG. 6, the REG is marked by bold solid lining. The PDFICH and the PHICH respectively include 4 REGs and 3 REGs. The PDCCH s configured in CCE (Control Channel Element) units, wherein one CCE includes 9 REGs.

In order to verify whether or not a PDCCH being configured one L number of CCEs is being transmitted to the user equipment itself, the user equipment is configured to verify $M(L)(\geq L)$ number of CCEs being consecutively aligned or aligned according to a specific alignment rule. The L value that should be considered by the user equipment for the PDCCH reception may correspond to a plurality of values. A group of CCEs that should be verified by the user equipment for the PDCCH reception is referred to as a search space. For example, the LTE system defines the search space as shown in Table 1 below.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

Herein, the CCE aggregation level L represents the number of CCEs configuring the PDDCH. $S_k^{(L)}$ represents the search space of the CCE aggregation level L, and M(L) represents the number of PCDDH candidates that are to be monitored in the search space of the aggregation level L.

The search space may be categorized as a UE-specific search space, which allows access only to specific user equipments, and a common search space, which allows the access of all user equipments existing within the corresponding cell. The user equipment monitors the common search spaces having the CCE aggregation levels 4 and 8 and also monitors UE-specific search spaces having the CCE aggregation levels 1, 2, 4, and 8. Herein, the common search space and the UE-specific search space may be overlapped.

Furthermore, in the PDCCH search space assigned to an arbitrary user equipment with respect to each CCE aggregation level value, the position of the first CCE (CCE having the lowest index) varies for each subframe in accordance with the user equipment. This is referred to as PDCCH search space hashing.

Figure 7:
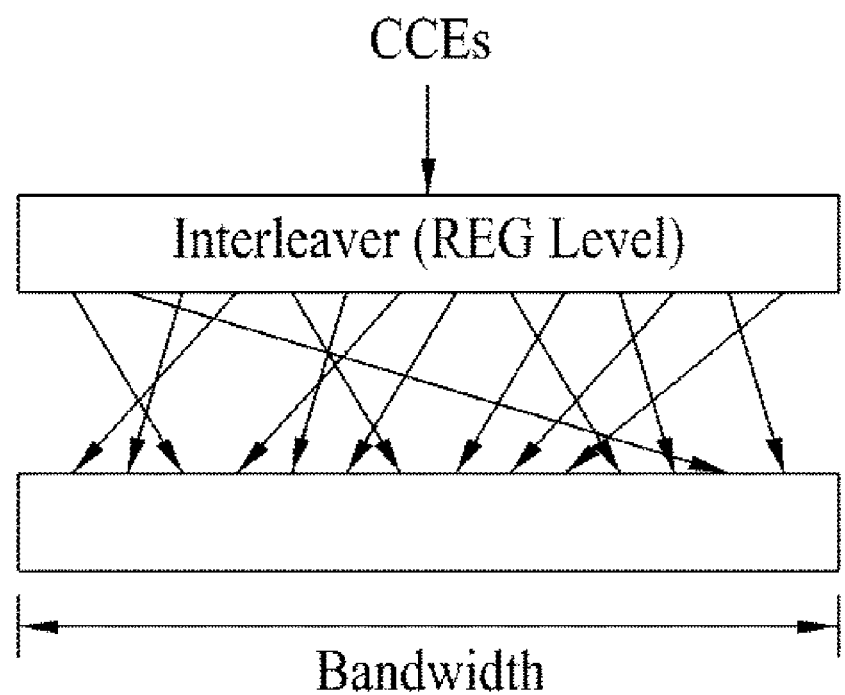
FIG. 7 illustrates an example of distributing CCE to a system band.

FIG. 7 illustrates an example of distributing (or spreading) CCE to a system band. Referring to FIG. 7, a plurality of logically consecutive CCEs may be inputted to an interleaver. The interleaver performs a function of mixing (or interleaving) the plurality of inputted CCEs in REG units. Accordingly, the frequency/time resource configuring one CCE is physically spread throughout the entire frequency/time domain within the control region of the subframe, thereby being distributed. Eventually, although the control channel is configured in CCE units, by performing the interleaving process in REG units, frequency diversity and interference randomization may be maximized.

Figure 8:
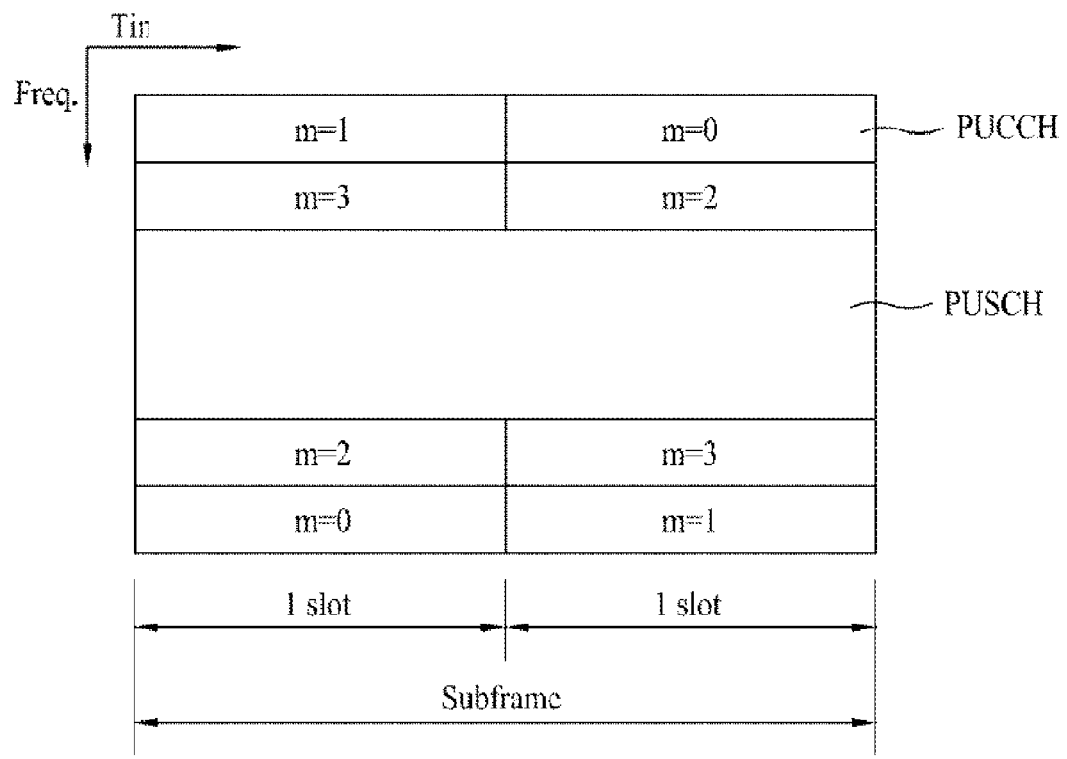
FIG. 8 illustrates an exemplary structure of an uplink subframe that is used in the LTE system.

FIG. 8 illustrates an exemplary structure of an uplink subframe that is used in the LTE system.

Referring to FIG. 8, an uplink subframe may be divided into a region having a PUCCH (Physical Uplink Control CHannel) carrying control information allocated thereto, and a region having a PUSCH (Physical Uplink Shared CHannel) carrying user data allocated thereto. A middle portion of the subframe is allocated to the PUSCH, and both end portions of the data region within the frequency domain are allocated to the PUCCH. The control information that is transmitted over the PUCCH includes an ACK/NACK being used for the HARQ, a CQI (Channel Quality Indicator) indicating a downlink channel status, an RI (Rank Indicator) for MIMO, an SR (Scheduling Request) corresponding to an uplink resource allocation request, and so on. The PUCCH for one user equipment uses one resource block, which occupies a different frequency for each slot within the subframe. More specifically, 2 resource blocks being allocated to the PUCCH are frequency hopped at a slot boundary. Most particularly, FIG. 7 shows an example of a PUCCH wherein m=0, a PUCCH wherein m=1, a PUCCH wherein m=2, and a PUCCH wherein m=3 are allocated to the subframe.

Meanwhile, if the channel status between the base station and the user equipment is poor (or deficient), a Relay Node (RN) may be installed, so that a radio channel having a more enhanced channel status can be provided to the user equipment. Also, by adopting and using a relay node from the base station in a cell boundary region having a poor channel status, a data channel having a faster rate may be provided, and a cell service region may be extended. As described above, the relay node, which is currently most broadly used, corresponds to a technology that is adopted to resolve radio shadow areas within the wireless (or radio) communication system.

As opposed to the precedent methods, which were limited to the functions of a repeater transmitting signals by simply amplifying the signals, the recent methods have been evolving to a more intelligent form. Furthermore, the relay node technology corresponds to a technology that is required for reducing costs for additional base station installation and costs for maintaining a backhaul network within the next generation mobile communication system, and that is, at the same time, required for extending service coverage and enhancing the data processing rate. As the relay node technology is gradually being developed, the relay node that is used in the related art wireless communication system is required to be supported by the new mobile communication system.

In the 3GPP LTE-A (3rd Generation Partnership Project Long Term Evolution-Advanced) system, by adopting the function of forwarding a link access (or link connection) between the base station and the user equipment to the relay node, two types of links, each having a different property, may be applied to each of the uplink and downlink carrier frequency bands. An access link portion configured between the links of the base station and the relay node is defined and expressed as a backhaul link. And, a transmission that is realized in an FDD (Frequency Division Duplex) or TDD (Time Division Duplex) method by using a downlink resource may be referred to as a backhaul downlink, and a transmission that is realized in an FDD (Frequency Division Duplex) or TDD (Time Division Duplex) method by using an uplink resource may be referred to as a backhaul uplink.

Figure 9:
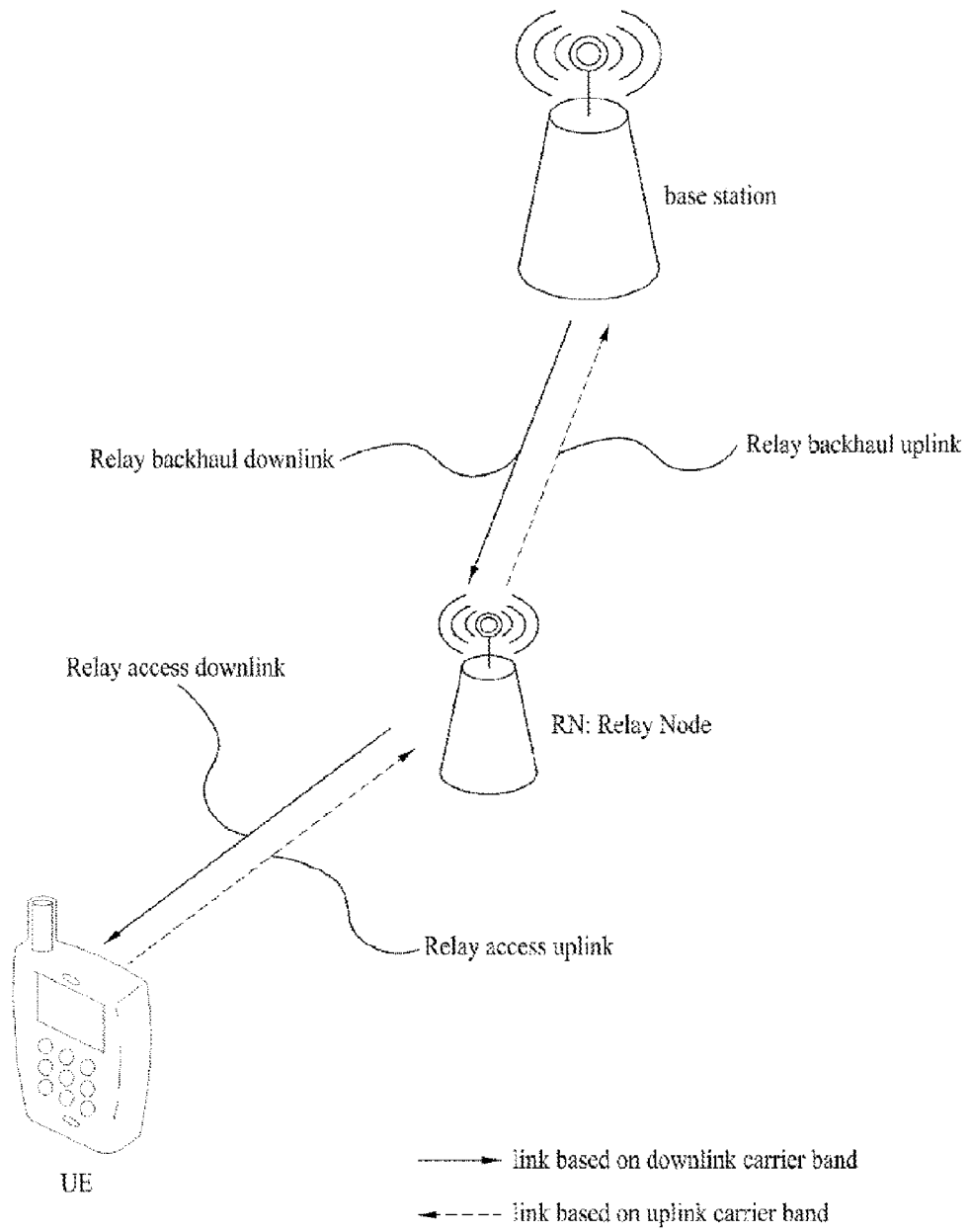
FIG. 9 illustrates structures of a relay backhaul link and a relay access link in a wireless communication system.

FIG. 9 illustrates structures of a relay backhaul link and a relay access link in a wireless communication system.

Referring to FIG. 9, as the relay node is adopted for the function of forwarding a link access (or link connection) between the base station and the user equipment, two types of links, each having a different property, may be applied to each of the uplink and downlink carrier frequency bands. Herein, an access link portion configured between the links of the base station and the relay node is defined and expressed as a relay backhaul link. When transmission of the backhaul link is realized by using a downlink frequency band (in case of the Frequency Division Duplex (FDD)) or a downlink subframe (in case of the Time Division Duplex (TDD)) resource, the backhaul link may be referred to as a backhaul downlink, and when transmission of the backhaul link is realized by using an uplink frequency band (in case of the FDD) or an uplink subframe (in case of the TDD) resource, the backhaul link may be referred to as a backhaul uplink.

On the other hand, an access link portion configured between the relay node and a series of user equipments is defined and expressed as a relay access link. When transmission of the relay access link is realized by using a downlink frequency band (in case of the FDD) or a downlink subframe (in case of the TDD) resource, the relay access link may be referred to as an access downlink, and when transmission of the relay access link is realized by using an uplink frequency band (in case of the FDD) or a downlink subframe (in case of the TDD) resource, the relay access link may be referred to as an access uplink.

The relay node (RN) may receive information from the base station via relay backhaul downlink and may transmit information to the base station via relay backhaul uplink. Also, the relay node may transmit information to the user equipment via relay access downlink and may received information from the user equipment via relay access uplink.

Meanwhile, in association with the usage of a band (or spectrum) of the relay node, an 'in-band' refers to a case where the backhaul link operates in the same frequency band as the access link, and an 'out-band' refers to a case where the backhaul link operates in a same frequency band different from that of the access link. In both in-band and out-band, the user equipment (hereinafter referred to as a legacy user equipment) that operates in accordance with the conventional LTE system (e.g., Release-8) should be capable of accessing a donor cell.

Depending upon whether or not the user equipment recognizes the relay node, the relay node may be categorized as a transparent relay node or a non-transparent relay node. The relay node is determined as being transparent, when it is difficult to recognize whether or not the user equipment is communicating with the network through the relay node, and the relay node is determined as being non-transparent, when it is recognized that the user equipment is communicating with the network through the relay node.

In relation with the control of the relay node, the relay node may be identified as a relay node being configured as a portion of the donor cell or as a relay node controlling the cell by itself.

The relay node being configured as a portion of the donor cell may have a relay node identifier (ID). However, in this case, the relay node does not have its own cell identity. When at least a portion of an RRM (Radio Resource Management) is controlled by the base station to which the corresponding cell belongs (even if the remaining portions of the RRM are located in the relay node), the relay node is referred to as a relay node being configured as a portion of the donor cell. Preferably, such relay node may support the legacy user equipment. For example, diverse types of relay nodes, such as Smart repeaters, decode-and-forward relays, L2 (second layer) relay nodes, and Type-2 relay nodes correspond to such relay node.

In case of the relay node controlling the cell by itself, the relay node may control one cell or multiple cells, and the cell being controlled by the relay node may each be provided with a unique physical layer cell identity, and the same RRM mechanism may be used. In the perspective of the user equipment, there is no difference between accessing a cell that is being controlled by the relay node and accessing a cell that is being controlled by a general base station. Preferably, the cell that is being controlled by such relay node may support the legacy user equipment. For example, Self-backhauling relay nodes, L3 (third layer) relay nodes, Type-1 relay nodes, and Type-1a relay nodes may correspond to such relay node.

As an in-band relay node, the Type-1 relay node controls a plurality of cells, and each of the plurality of cell may be viewed by the user equipment as separate cells being differentiated from the donor cell. Also, each of the plurality of cells has its own physical cell ID (defined in LTE Release-8), and the relay node may transmits its synchronization channel, reference signal, and so on. In case of a single-cell operation, the user equipment may directly receive scheduling information and HARQ feedback from the relay node and may transmit its control channel (scheduling request (SR), CQI, ACK/

NACK, etc.) to the relay node. Also, the Type-1 relay node may be viewed as a legacy base station (base station operating in accordance with the LTE Release-8 system) by the legacy user equipments (user equipments operating in accordance with the LTE Release-8 system). More specifically, backward compatibility is provided. Meanwhile, for the user equipments operating in accordance with the LTE-A system, the Type-1 relay node may be viewed as a base station other than the legacy base station. Thus, performance may be enhanced.

With the exception for operating as an out-band relay node, the Type-1a relay node has the same features and characteristics as the above-described Type-1 relay node. The operations of Type-1a relay node may be configured so that influence caused by the operations of L1 (first layer) can be minimized or eliminated.

As an in-band relay node, the Type-2 relay node does not have a separate physical cell ID and, accordingly, the Type-2 relay node does not create (or configure) a new cell. The Type-2 relay node corresponds to a transparent relay node for the legacy user equipment, and the legacy user equipment is incapable of recognizing the existence of the Type-2 relay node. The Type-2 relay node may transmit the PDSCH but does not transmit at least the CRS and the PDCCH.

Meanwhile, in order to enable the relay node to operate as an in-band relay node, a portion of the resource corresponding to the time-frequency domain should be reserved for a backhaul link, and this resource may be configured so that the corresponding resource cannot to be used for an access link. This is referred to as resource partitioning.

The general principle of resource partitioning in a relay node may be described as follows. A backhaul downlink and an access downlink may be multiplexed within a single carrier frequency by using a Time Division Multiplexing (TDM) scheme (i.e., only one of the backhaul downlink and the access downlink is activated at a specific time). Similarly, a backhaul uplink and an access uplink may be multiplexed within a single carrier frequency by using a TDM scheme (i.e., only one of the backhaul uplink and the access uplink is activated at a specific time).

Backhaul link multiplexing in the FDD may be described that a backhaul downlink transmission is performed in a downlink frequency band, and that a backhaul uplink transmission is performed in an uplink frequency band. Backhaul link multiplexing in the TDD may be described that a backhaul downlink transmission is performed in a downlink subframe of the base station and the relay node, and that a backhaul uplink transmission is performed in an uplink subframe of the base station and the relay node.

In case of the in-band relay node, for example, when a backhaul downlink reception from the base station and an access downlink transmission to the user equipment are realized at the same time in a predetermined frequency band, a signal being transmitted from a transmitting end of the relay node may be received by a receiving end of the relay node. And, accordingly, signal interference or RF jamming may occur in an RF front-end of the relay node. Similarly, when an access uplink reception from the user equipment and a backhaul uplink transmission to the base station are realized at the same time in a predetermined frequency band, a signal interference may occur in an RF front-end of the relay node. Therefore, in the relay node, if sufficient partitioning (e.g., installing a transmitting antenna and a receiving antenna by sufficiently spacing them apart geographically (e.g., above the ground level/underground)) between the receiving signal and the transmitting signal fails to be provided, it will be difficult to realize a simultaneous reception and transmission within a frequency band.

One of the methods for resolving such problem of signal interference is to configure the operations so that the relay node does not transmit a signal to the user equipment, while the relay node receives a signal from the donor cell. More specifically, a gap period is formed in the transmission from the relay node to the user equipment. And, the user equipment (including the legacy user equipment) may be configured to not expect any kind of transmission from the relay node during the gap period. This gap period may be set up by configuring an MBSFN (Multicast Broadcast Single Frequency Network) subframe.

Figure 10:
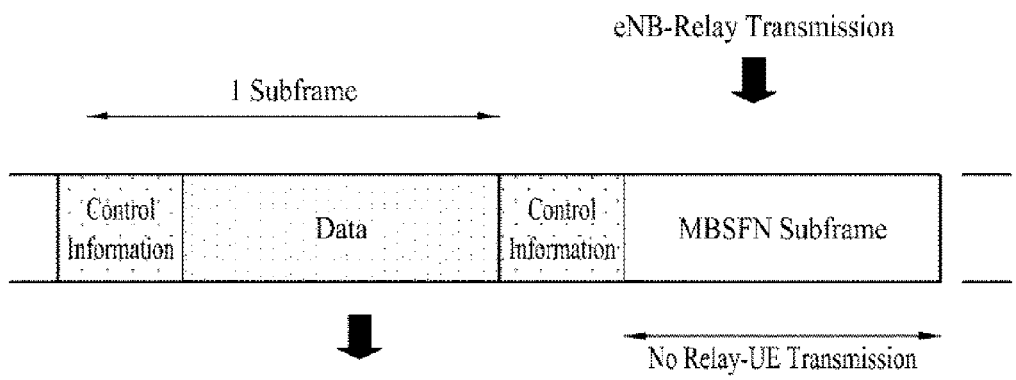
FIG. 10 illustrates an exemplary relay node resource division.

FIG. 10 illustrates an exemplary relay node resource division.

In FIG. 10, a first subframe corresponds to a general subframe, wherein a downlink (i.e., access downlink) control signal and data are transmitted from the relay station to the user equipment. And, a second subframe corresponds to an MBSFN subframe, wherein a control signal is transmitted from the relay node to the user equipment in the control region of the downlink subframe, and wherein no transmission is performed from the relay node to the user equipment in the remaining regions of the downlink subframe. Herein, in case of the legacy user equipment, since the transmission of a downlink physical layer channel (PDCCH) is expected in all downlink subframes (in other words, since the relay node is required to support the legacy user equipments within the regions of the relay node itself, so that the corresponding legacy user equipments can receive the PDCCH in each subframe and perform measurement functions), in order to allow the legacy user equipment to perform the correct operations, the PDCCH is required to be transmitted from all downlink subframes. Therefore, in a subframe (second subframe (1020)), which is configured to perform downlink (i.e., backhaul downlink) transmission from the base station to the relay node, in the first N number of OFDM symbol sections (wherein N=1, 2, or 3) of the subframe, instead of receiving a backhaul downlink, the relay node is required to perform access downlink transmission. Respectively, since the PDCCH is transmitted from the relay node to the user equipment in the control region of the second subframe, backward compatibility for a legacy user equipment, which is served by the relay node, may be provided. In the remaining regions of the second subframe, while no transmission is performed from the relay node to the user equipment, the relay node may receive transmission from the base station. Therefore, by using such resource partitioning method, access downlink transmission and backhaul downlink reception may not be performed simultaneously in the in-band relay node.

A second subframe using an MBSFN subframe will now be described in detail. The control region of the second subframe may be referred to as a relay node non-hearing section. The relay node non-hearing section refers to a section that does not receive backhaul downlink signal and that transmits an access downlink signal. As described above, this section may be configured to have the length of 1, 2, or 3 OFDM. In the relay node non-hearing section, the relay node may perform access downlink transmission to the user equipment, and, in the remaining regions, the relay node may receive backhaul downlink from the base station. At this point, since the relay node cannot simultaneously perform transmission and reception in the same frequency band, a considerable amount of time is required for the relay node to switch from the transmission mode to the reception mode. Therefore, a guard time (GT) is required to be set up so that the relay node can switch to and from the transmission/reception modes, during the first partial section of the backhaul downlink reception region.

Similarly, even when the relay node is operated to receive a backhaul downlink from the base station and to transmit an access downlink to the user equipment, a guard time (GT) is required to be set up so that the relay node can switch to and from the transmission/reception modes. A time domain value may be given as the length of such guard time, for example, k (k≥1) number of time sample (Ts) may be given as the length of the guard time, or at least one or more OFDM symbol length may be given as the guard time length. Alternatively, in case relay node backhaul downlink subframes are consecutively configured, or depending upon a predetermined subframe timing alignment relation, the guard time of the last portion of the subframe may not be defined nor configured. In order to maintain such backward compatibility, the guard time may be defined only in the frequency domain, which is configured for backhaul downlink subframe transmission (in case the guard time is configured in an access downlink section, the legacy user equipment cannot be supported). In the backhaul downlink reception section excluding the guard time, the relay node may receive the PDCCH and the PDSCH from the base station. As relay node specific physical channels, such channels may also be referred to as an R-PDCCH (Relay-PDCCH) and an R-PDSCH (Relay-PDSCH).

Unlike the PDCCH of the LTE system, the R-PDCCH, which is a relay node specific physical channel, may not exist in the entire band. Therefore, in order to reduce blind decoding complexity so as to minimize the waste in resource, it is preferable to configure a Search Space for the R-PDCCH by using a minimum portion of the resource.

Additionally, it is preferable that the size of the search space for the R-PDCCH varies depending upon the system bandwidth. Herein, the system bandwidth may be expressed by the number of resource blocks (RBs). More specifically, in case the system bandwidth is 100 RB, the size of the search space for the R-PDCCH may be set to 25 RB. And, in case the system bandwidth is 50 RB, the size of the search space for the R-PDCCH may be set to 12 RB.

Furthermore, the number of resource blocks configuring the system bandwidth may be compartmentalized to specific ranges, and the size of a resource block group (RBG), which is the basic unit for resource allocation, may be decided based upon this range. Therefore, the search space for the R-PDCCH may be determined in accordance with the resource block group (RBG) size respective to the system bandwidth. Most particularly, considering the size of the resource block group (RBG), N number of search spaces per RBG may be determined Herein, it is preferable that N is smaller than RBG. Table 2 below shows the size of the search space when N is equal to 1.

TABLE 2

| System bandwidth (RB) | Resource allocation Unit size (RB size) | R-PCCCH space (RB) |
|---|---|---|
| <=10 | 1 | <=10 |
| 11~26 | 2 | 6~23 |
| 27-63 | 3 | 9~21 |
| 64-110 | 4 | 16~28 |

Referring to Table 2, the N value may be equal to 1, 2, 3, . . . or may be equal to 0.5, 0.25, . . . . In case, N is equal to 0.5, this indicates that 1 RB is determined as the search space for 2 RBGs.

Meanwhile, it is preferable that the search spaces for the R-PDCCH are coordinated so that inter-cell interference can be avoided. More specifically, the search spaces for the R-PDCCH may be configured in different locations so that inter-cell interference between neighboring cells can be minimized.

Figure 11:
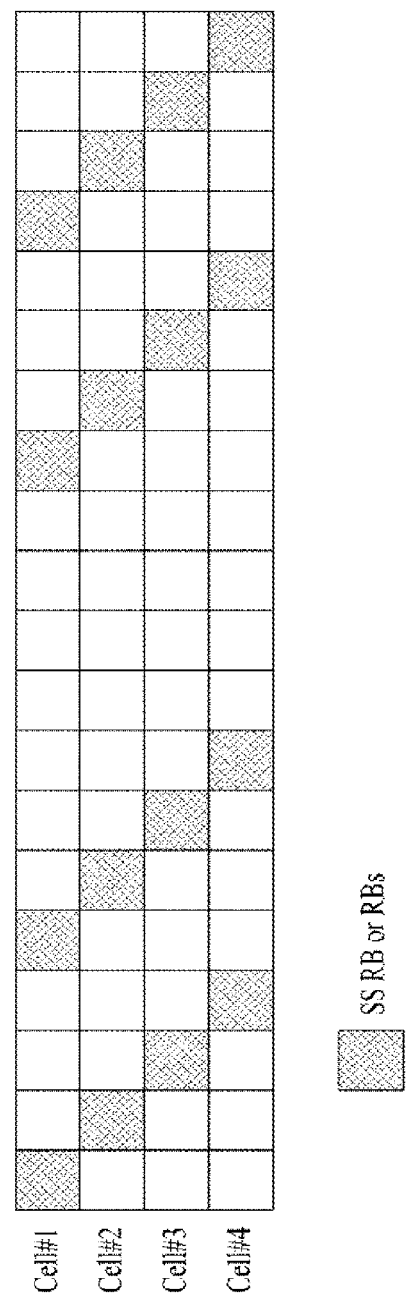
FIG. 11 illustrates a method for configuring a search area for an R-PDCCH in order to alleviate inter-cell interference according to an embodiment of the present invention.

FIG. 11 illustrates a method for configuring a search area for an R-PDCCH in order to alleviate inter-cell interference according to an embodiment of the present invention. Referring to FIG. 11, when an RBG having the size of 4 RB is used in a 110 RB system bandwidth, and when the starting point of the search space for Cell#1 starts from the first RB of each RBG, the starting point of the search space for Cell#2, which is adjacent to Cell#1 or requires adjustment, may start from a different RB position excluding the first RB of each RBG. A similar method is applied for Cell#2 and Cell#3. Accordingly, by adjusting the starting point of the search space, inter-cell R-PDCCH conflict (or collision) that can cause inter-cell interference may be minimized.

In FIG. 11, although it is preferable that the aggregation level, i.e., the number of R-CCEs (or RBs) configuring the search space, does not exceed the RBG size, if the aggregation level exceeds the RBG size, the maximum gap size of the search space may be increased to a specific multiple of the RBG. This will be described in more detail with reference to FIG. 12.

Figure 12:
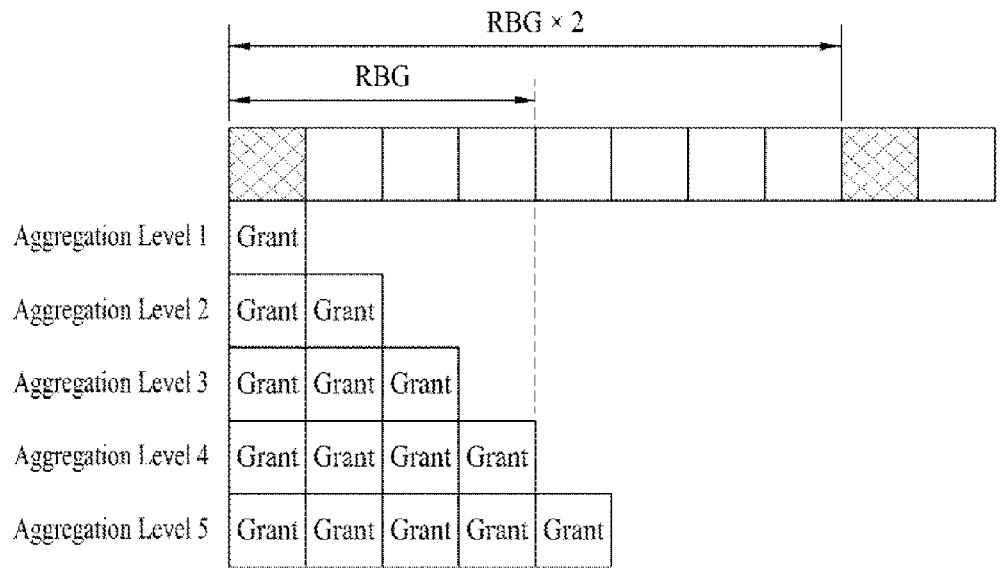
FIG. 12 illustrates an example of configuring an interval between search areas with two RBG units.

FIG. 12 illustrates an example of configuring an interval between search areas with two RBG units. Most particularly, referring to FIG. 12, one RBG is configured of 4 RBs. In case the gap between the search spaces is configured as shown in FIG. 12, a search space configured of 8 RBs, i.e., an R-PDCCH having the aggregation level of 8 may be detected.

Meanwhile, when blind decoding is performed in a search space, which is configured of a number of RBs smaller than the actual aggregation level of FIG. 12, the R-PDCCH is very likely to be decoded. For example, when a downlink grant configured of 4 RBs (or R-CCEs) is blind decided in a search space configured of 1 RB (or R-CCE), the decoding process may be successful. Such error may occur because the relay is unaware of the actual aggregation level to which the R-PDCCH is transmitted. In order to resolve such problems, the present invention proposes a mapping method for the R-PDCCH as described below.

Figure 13:
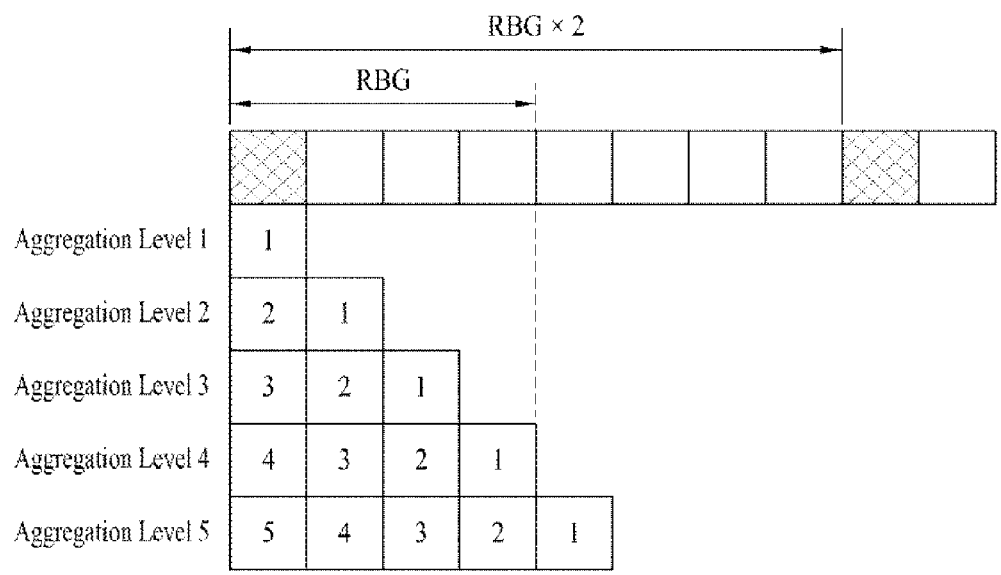
FIG. 13 illustrates a mapping method of an R-PDCCH according to a first embodiment of the present invention.

FIG. 13 illustrates a mapping method of an R-PDCCH according to a first embodiment of the present invention. Most particularly, referring to FIG. 13, when the base station transmits the R-PDCCH to the relay node, the R-PDCCH is mapped by an inverse index order of the RBs (or R-CCEs) allocated to the R-PDCCH.

Figure 14:
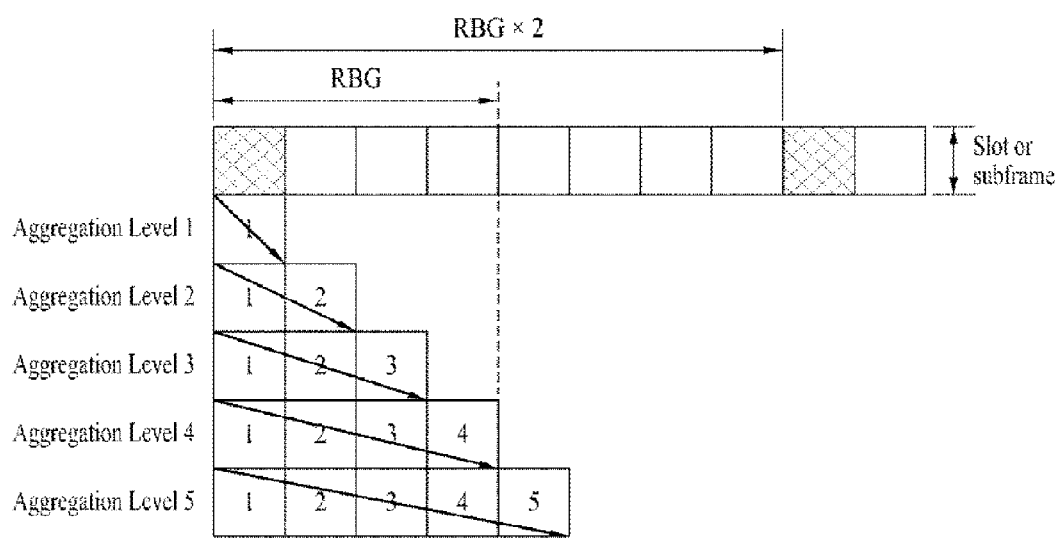
FIG. 14 and FIG. 15 illustrate mapping methods of an R-PDCCH according to a second embodiment of the present invention.
Figure 15:
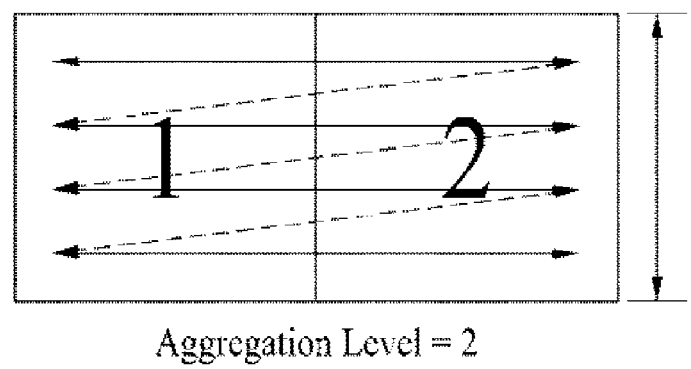

FIG. 14 and FIG. 15 illustrate mapping methods of an R-PDCCH according to a second embodiment of the present invention.

Referring to FIG. 14, when mapping the R-PDCCH, among the allocated resource area, mapping is first performed along the frequency direction on a symbol belonging to the lowest index. Then, mapping is performed along the frequency direction on a symbol belonging to the next index. More specifically, the second embodiment of the present invention may be referred to as a Frequency first mapping of the R-PDCCH. This is in contrast with the Time first mapping, which corresponds to the PDCCH mapping method used in the conventional LTE system.

FIG. 15 illustrates an example of the allocated resource being equal to 2 RBs (or 2 R-CCEs), i.e., an example of mapping an R-PDCCH having an aggregation level of 2. Referring to FIG. 15, among the allocated two RBs (or two R-CCEs), mapping is performed on the two RBs (or two R-CCEs) along the frequency direction starting from the symbol belonging to the lowest index. Thereafter, mapping is also performed on the two RBs (or two R-CCEs) along the frequency direction starting from the symbol belonging to the next index.

The above-described error of the R-PDCCH may occur because the relay node is not accurately aware of the actual R-PDCCH aggregation level transmitted from the base station. Therefore, a method of recognizing the actual aggregation level by configuring an identification point on each of the RBs (or R-CCEs) actually allocated to the R-PDCCH may also be applied.

Figure 16:
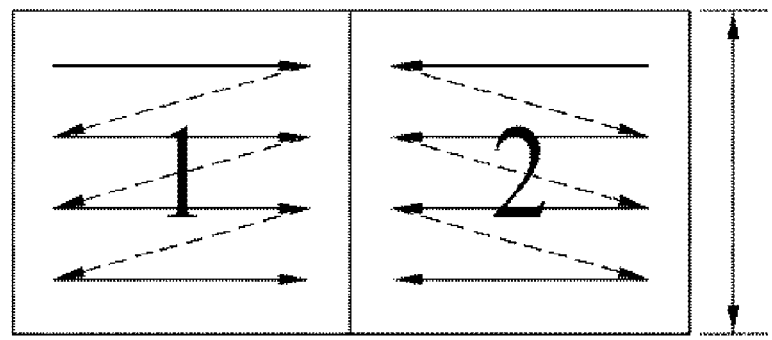
FIG. 16 illustrates a mapping method of an R-PDCCH according to a third embodiment of the present invention.

FIG. 16 illustrates a mapping method of an R-PDCCH according to a third embodiment of the present invention. Referring to FIG. 16, it is also assumed that 2 RBs are allocated as the resource for the R-PDCCH.

The characteristic feature of FIG. 16 is that, among the 2 RBs, resource mapping of the first RB and the second RB is performed along the frequency direction but in opposite directions. More specifically, in the first RB, frequency first mapping for the R-PDCCH is performed by an increasing frequency order starting from the lowest frequency index. And, in the second RB, frequency first mapping for the R-PDCCH is performed by a decreasing frequency order starting from the highest frequency index.

Figure 17:
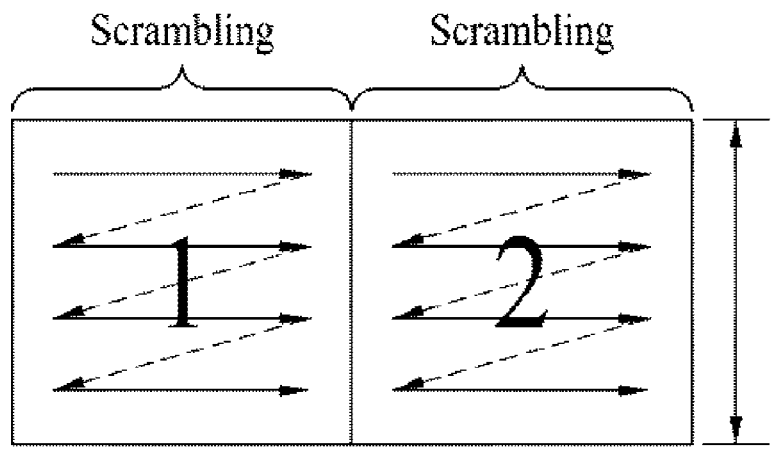
FIG. 17 illustrates a mapping method of an R-PDCCH according to a fourth embodiment of the present invention.

FIG. 17 illustrates a mapping method of an R-PDCCH according to a fourth embodiment of the present invention. Referring to FIG. 17, it is also assumed that 2 RBs are allocated as the resource for the R-PDCCH.

Referring to FIG. 17, a method of signaling the actual aggregation level by applying a different scrambling code for each RB having the R-PDCCH mapped thereto may be proposed. In the conventional LTE system, the same scrambling code has been applied to all RBs having the PDCCH mapped thereto, wherein the PDCCH is transmitted to the user equipment. However, according to the present invention, with respect to the R-PDCCH only, a method of applying a different scrambling code for each RB having the R-PDCCH mapped thereto may be proposed.

Figure 18:
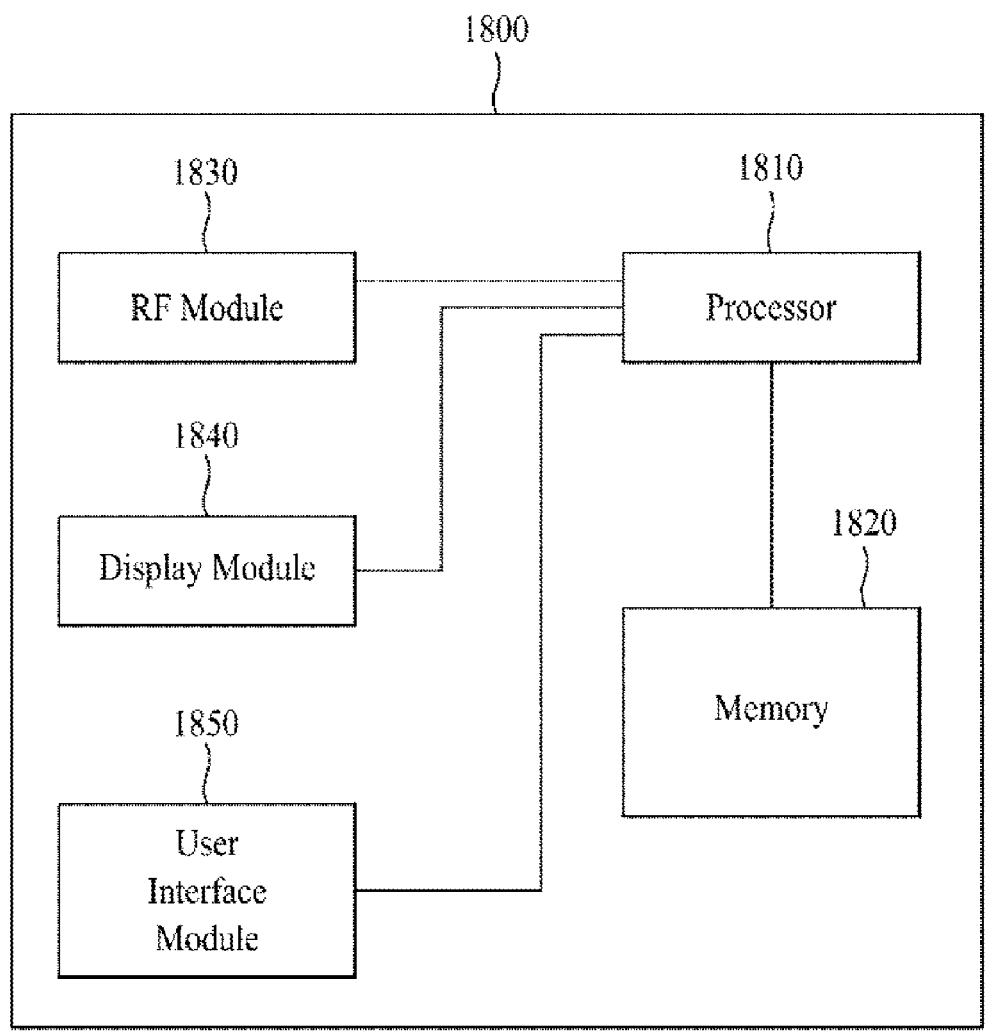
FIG. 18 illustrates a block view showing the structure of a communication apparatus according to an embodiment of the present invention.

FIG. 18 illustrates a block view showing the structure of a communication apparatus according to an embodiment of the present invention.

Referring to FIG. 18, a communication apparatus (1800) includes a processor (1810), a memory (1820), an RF module (1830), a display module (1840), and a user interface module (1850).

The communication apparatus (1800) is an exemplary illustration provided to simplify the description of the present invention. Also, the communication apparatus (1800) may further include necessary modules. Also, in the communication apparatus (1800) some of the modules may be divided into more segmented modules. Referring to FIG. 18, an example of the processor (1810) is configured to perform operations according to the embodiment of the present invention. More specifically, for the detailed operations of the processor (1810), reference may be made to the description of the present invention shown in FIG. 1 to FIG. 17.

The memory (1820) is connected to the processor (1810) and stores operating systems, applications, program codes, data, and so on. The RF module (1830) is connected to the processor (1810) and performs a function of converting baseband signals to radio (or wireless) signals or converting radio signals to baseband signals. In order to do so, the RF module (1830) performs analog conversion, amplification, filtering, and frequency uplink conversion or inverse processes of the same. The display module (1840) is connected to the processor (1810) and displays diverse information. The display module (1840) will not be limited only to the example given herein. In other words, generally known elements, such as LCD (Liquid Crystal Display), LED (Light Emitting Diode), OLED (Organic Light Emitting Diode) may also be used as the display module (1840). The user interface module (1850) is connected to the processor (1810), and the user interface module (1850) may be configured of a combination of generally known user interfaces, such as keypads, touchscreens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention have been described by mainly focusing on the data transmission and reception relation between the relay node and the base station. Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term Base Station (BS) may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations.

A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

Although the above-described method for transmitting control channel in wireless communication system and apparatus thereof are described by mainly focusing on an example applied to the 3GPP LTE system, in addition to the 3GPP LTE system, the present invention may also be applied to a wider range of multiple antenna wireless communication systems.

What is claimed is:

1. A method for receiving a Relay Physical Downlink Control CHannel (R-PDCCH) by a User Equipment (UE) in a wireless communication system, the method comprising:
   monitoring the R-PDCCH on the one or more aggregated resource blocks including resource elements, wherein the resource elements are mapped in an increasing order of first a subcarrier index, and then a symbol index,
   wherein the one or more aggregated resource blocks are numbered based on an aggregation level and a number of the one or more aggregated resource blocks corresponding to the aggregation level, and
   wherein the resource blocks are defined according to a downlink bandwidth configuration and a resource block size.

2. The method of claim 1, wherein the UE is a relay node.

3. The method of claim 1, wherein the one or more aggregated resource blocks are configured to detect the R-PDCCH.

4. A User Equipment (UE) for receiving a Relay Physical Downlink Control CHannel (R-PDCCH) in a wireless communication system, the UE comprising:
   a radio frequency unit (RF unit); and
   a processor configured to monitor the R-PDCCH on the one or more aggregated resource blocks including resource elements,
   wherein the resource elements are mapped in an increasing order of first a subcarrier index, and then a symbol index,
   wherein the one or more aggregated resource blocks are numbered based on an aggregation level and a number of the one or more aggregated resource blocks corresponding to the aggregation level, and
   wherein the resource blocks are defined according to a downlink bandwidth configuration and a resource block size.

5. The UE of claim 4, wherein the UE is a relay node.

6. The UE of claim 4, wherein the one or more aggregated resource blocks are configured to detect the R-PDCCH.

* * * * *